May 26, 1953
W. G. WEHR
2,640,114
SHOCKPROOF CONDUCTOR FOR ELECTRIFIED
MATERIAL HANDLING APPARATUS
Filed May 21, 1948
4 Sheets-Sheet 3
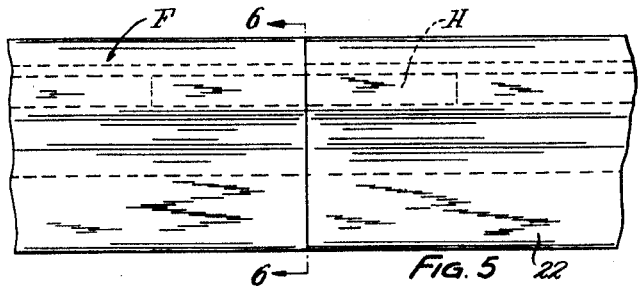
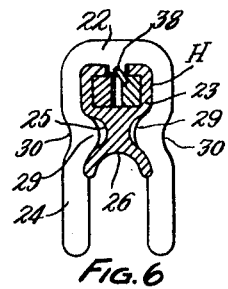
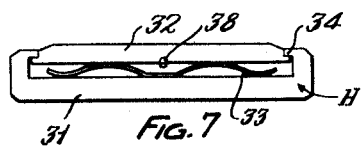
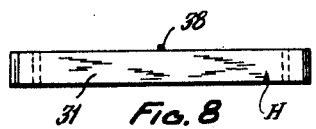
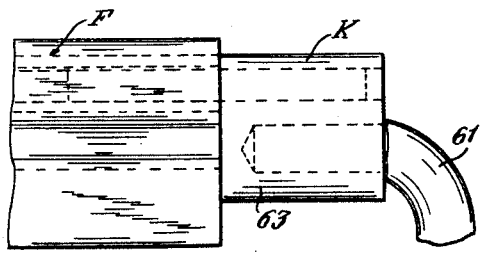
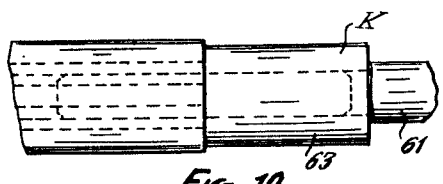
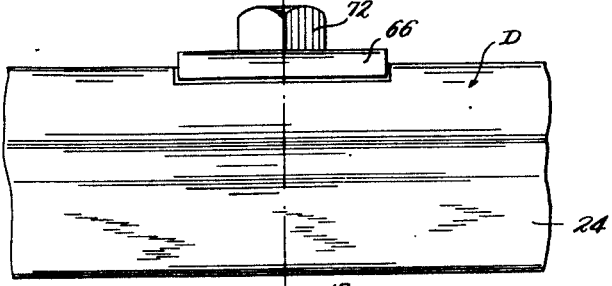
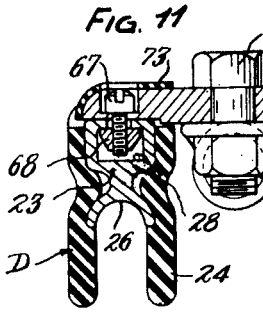
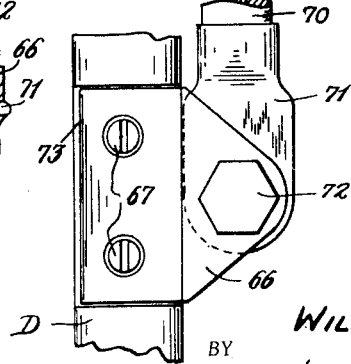
INVENTOR.
WILLIAM G. WEHR
BY Kwis, Hudson, Boughton & Williams
ATTORNEYS INVENTOR.
WILLIAM G. WEHR
BY
Kwis, Hudson, Boughton & Williams
ATTORNEYS Patented May 26, 1953

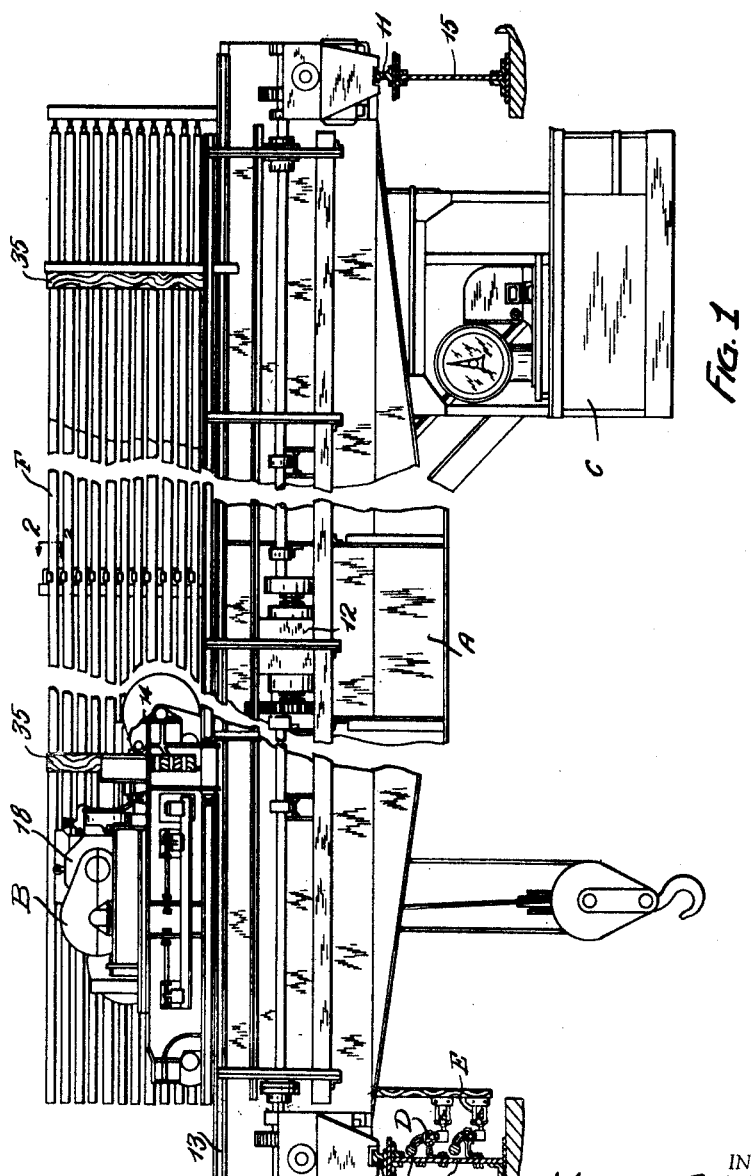

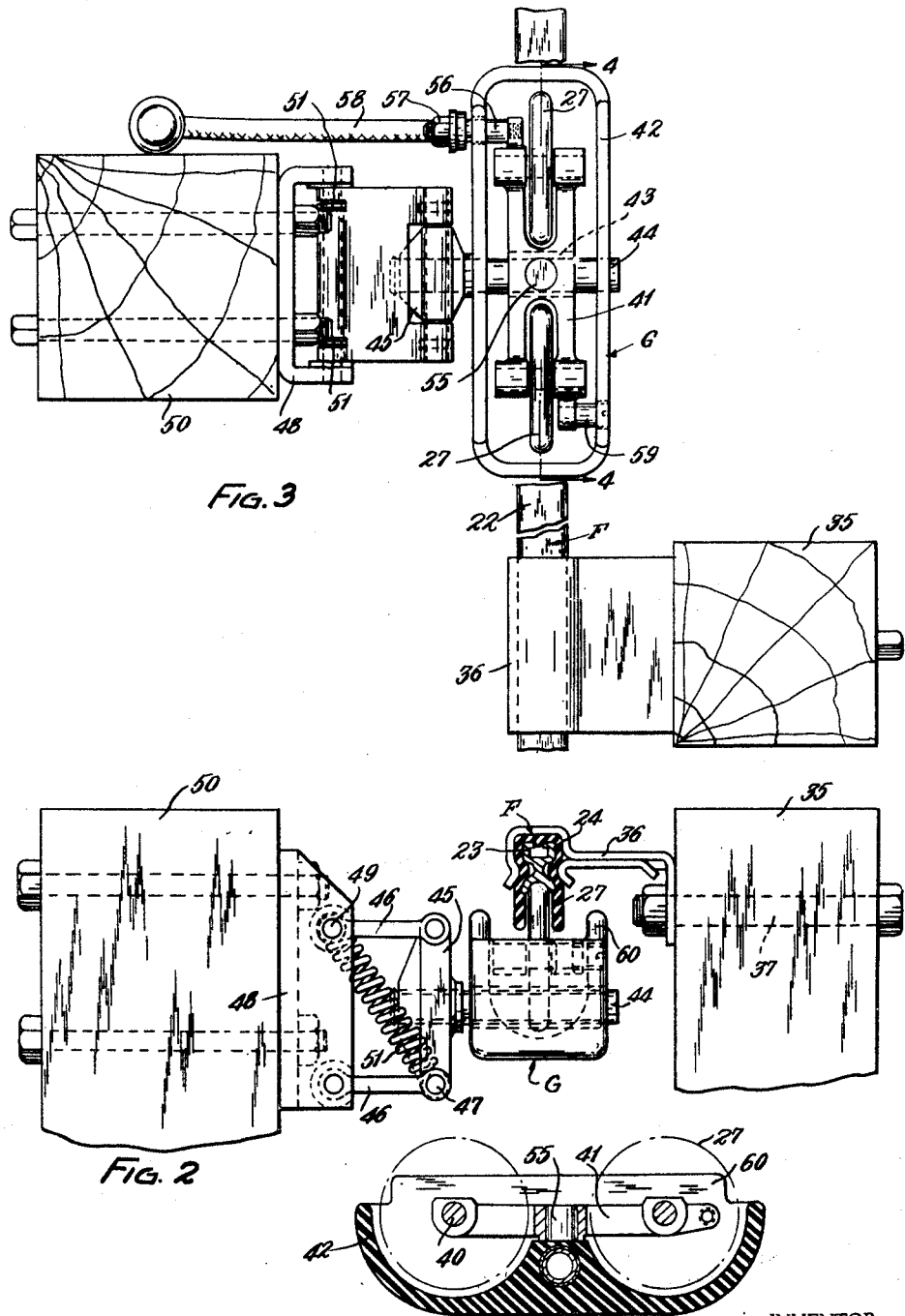

2,640,114

UNITED STATES PATENT OFFICE 2,640,114

SHOCKPROOF CONDUCTOR FOR ELECTRIFIED MATERIAL HANDLING APPARATUS

William G. Wehr, North Madison, Ohio, assignor to The Cleveland Crane & Engineering Company, Wickliffe, Ohio, a corporation of Ohio Application May 21, 1948, Serial No. 28,367

8 Claims. (Cl. 191—23)

The present invention relates to electrical distribution systems, and more particularly to electrical distribution systems for cranes, especially traveling cranes. This application is a continuation-in-part of my now abandoned application Serial No. 482,137, filed April 7, 1943, entitled "Electrical Distribution System," which is a division of my application Serial No. 295,802, now Patent No. 2,358,116.

An object of the invention is the provision of a novel electrical distribution system for overhead electrically powered, material handling apparatus, such as, cranes and the like, so constructed and arranged that it is practically impossible for workmen, etc., to accidentally come in contact with energized conductors or parts thereof.

Another object of the invention is the provision of a novel electrical distribution system of the character referred to, which is simple in construction, reliable in operation, and easy to install.

A further object of the invention is the provision of a novel and improved, rigid, rod-like composite conductor or conductor bar for an electrical distribution system of the character referred to, so constructed and arranged that a section or length of the composite conductor bar can be transversely cut at any place between its ends and the ends of the resultant lengths will be the same in configuration as those of the original length and lengths of the composite conductor bar can be assembled in abutting relationship with each other with one length forming a continuation of another and mechanically and electrically connected together by a connector means enclosed within adjoining ends of adjacent lengths of composite conductor bar.

The invention resides in certain constructions and combinations and arrangements of parts and further objects and advantages thereof will be apparent to those skilled in the art to which the invention relates from the following description thereof described with reference to the accompanying drawings forming a part of this specification in which similar reference characters designate corresponding parts, and in which Fig. 1 is a side elevational view, with portions broken away, of a traveling crane embodying the present invention;

Fig. 2 is a fragmentary sectional view on the line 2—2 of Fig. 1;

Fig. 3 is a plan view of the mechanism shown in Fig. 2;

Fig. 4 is a sectional view with the wheels omitted on the line 4—4 of Fig. 3;

Fig. 5 is an enlarged, side elevational view of one of the conductors showing the manner in which two sections or lengths of conductor bar are connected together;

Fig. 6 is a sectional view on the line 6—6 of Fig. 5;

Fig. 7 is a plan view of the connector shown in Fig. 5;

Fig. 8 is a side elevational view of the connector shown in Fig. 7;

Fig. 9 is a side elevational view of the right-hand end of one of the conductors of Fig. 1 showing an end conductor terminal;

Fig. 10 is a plan view of Fig. 9;

Fig. 11 is an end view of Fig. 9, looking from the right;

Fig. 12 is a side elevational view of one of the conductors of Fig. 1 showing a midway conductor terminal;

Fig. 13 is a sectional view on the line 13—13 of Fig. 12;

Fig. 14 is a plan view of the mechanism shown in Fig. 12;

Figure 15:
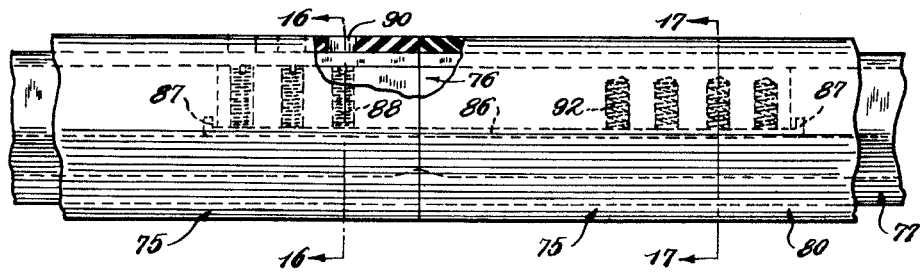
Fig. 15 is a fragmentary side elevational view similar to Fig. 5 but showing a modified construction.
Figure 16:
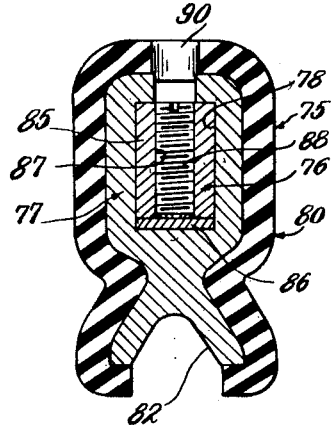
Figure 17:
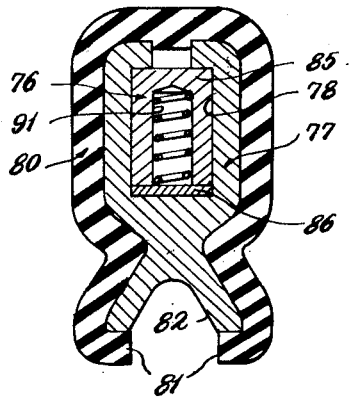
Figure 18:
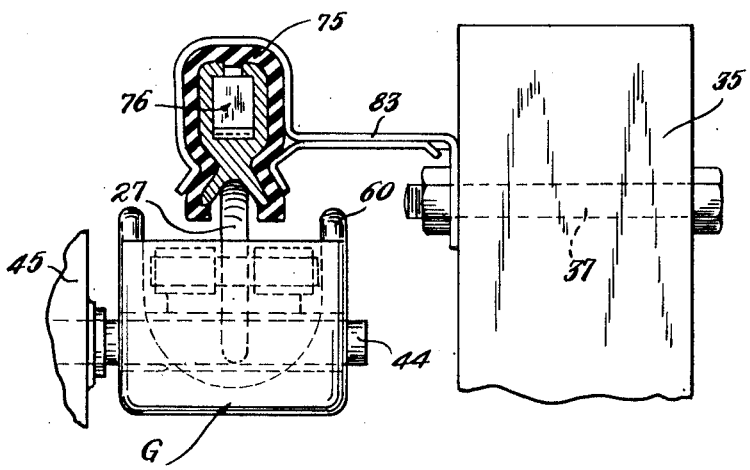

Figs. 16 and 17 are sectional views approximately on the lines 16—16 and 17—17, respectively, of Fig. 15; and Fig. 18 is a view similar to Fig. 2 but showing the modified construction of conductor.

While the invention is susceptible of various modifications and alternative constructions, it is herein shown and described as embodied in or applied to a traveling crane of the type ordinarily employed in buildings for moving heavy objects from place to place. Referring to the drawings, Fig. 1 shows a traveling crane similar to that disclosed in United States Patent No. 2,142,579 issued January 3, 1939 except for the electrical distribution system which has been modified to embody the present invention. Only those parts of the crane which are necessary to a complete understanding of the present invention are herein shown and described in detail. For a more complete description of the crane, reference is made to the above-mentioned patent.

The crane shown comprises a bridge A supported upon a plurality of rails 10 and 11 and adapted to be traveled therealong by a reversible electric motor 12, commonly referred to as the bridge motor, and a trolley B, supported upon rails 13 carried by the bridge A, and movable longitudinally of the bridge by a reversible electric motor 14, commonly referred to as the trolley motor. The rails 10 and 11 are supported by the building within which the crane is housed, etc., in a manner well known in the art. As shown, the rails 10 and 11 are supported on structural members 15, the left-hand one of which also supports the conductors D which supply electrical current to the crane, through the medium of collector assemblies E. The trolley B also comprises suitable hoist mechanism including a reversible electric motor 18. The actuation of the electric motors 12, 14 and 18 is adapted to be controlled from a control cage C suspended from the bridge A. The electric circuits between the mechanism located on the trolley B and in the control cage C are completed through the medium of trolley conductors F, of which there are twenty-two employed in the preferred embodiment of the invention shown, carried by the bridge A and collector assemblies G (see Fig. 2) carried by the trolley B. The crane thus far described is of conventional construction with the exception of the particular construction of the conductors D and F, the collector assemblies E and G, and the manner in which the conductors are supported and the connections made thereto.

According to the provisions of the present invention, the conductors D and F are made up of one or more sections or lengths of composite conductor or composite conductor bar 22 comprising a metal bar-like member 23 of uniform cross-section throughout its length enclosed, except for its ends and the side engaged by the current collector or collectors, within a channel-shaped insulating member 24 preferably made of rubber cemented or otherwise secured to the metal bar 23. The bar 23 which is preferably made of aluminum, is generally rectangular in cross-sectional shape and is provided with longitudinal grooves or depressions 25 on opposite sides thereof which, in addition to decreasing the weight of the bar, increase the radiating surface thereof, and assist in securing the insulating covering 24 thereto. When supported in the position shown, the underside of the bar 23 has a substantially semi-circular groove therein which provides a large concave contact surface 26 for the collector wheels 27 of the collector assemblies G. The upper part of the bar 23 is provided with a non-circular, longitudinal aperture 28 of uniform transverse cross-section extending from end to end thereof, the purpose of which will be hereinafter apparent. The insulating covering 24 is generally inverted, U-shape in cross-section with the free ends thereof projecting below the bar 23, and has a plurality of inwardly projecting ridges 29 adapted to cooperate with the longitudinal grooves 25 in securing the same to the metal bar 23. As shown, the insulating covering 24 is provided with a plurality of longitudinal grooves 30 exteriorly of the ridges 29, which grooves are utilized in supporting the conductors.

When a plurality of sections or lengths of composite conductor bar 22 are employed in making a conductor such as the conductors D or F, the abutting ends of adjacent conductor bars are aligned and electrically and mechanically connected together by connectors adapted to extend into the non-circular, longitudinal apertures in the adjoining ends of the conductor bars and be retained therein by friction or other suitable means. At least portions of the connector extending into the apertures in the composite conductor bars conform to a portion of the non-circular apertures in the conductor bars and prevent relative angular movement therebetween. The conductor bars preferably have a single longitudinal aperture therein and the preferred shape of this aperture is that shown in the drawings, which is of inverted, T-slot form. Alternatively, two circular apertures may be employed.

In the embodiment of the invention shown, a single resilient connector H wholly enclosed within the conductor bars is employed to align and mechanically and electrically connect abutting ends of adjacent conductor bars. The connector H comprises two parts 31 and 32 continuously urged apart by a leaf spring 33 interposed therebetween so that when assembled with the conductor bars the connector H is held in tight frictional engagement within the longitudinal apertures of the conductor bars. When not assembled with the conductor bars the two parts 31 and 32 of the connector H are held in assembled relationship with each other by flanges 34 on the member 31 which engage over the ends of the member 32. The resilient connector H is so constructed that it conforms substantially to the shape of and securely engages within the apertures of the respective conductor bars and holds the same in alignment and in fixed angular relation to each other. Provision may be made to assure half of the connector H being enclosed within each of the adjacent sections or length of conductor bar 22 in the form of a small pin 38 fixed to the upper side of the member 32 of the connector H and adapted to project outwardly into the groove 28 and embed itself between the ends of insulating material 24 when the conductor is assembled.

In the embodiment of the invention shown, the conductors F are carried by vertical members 35 formed of wood or other suitable insulating material fixed to the bridge A of the crane to which wooden members the conductors are secured by metal members 36 bolted to the wooden members 35 by means of bolts 37. The free ends of the members 36 are so formed that they engage around the upper part of the conductor bar and hold the same by friction, leaving the lower side of the conductor bar open. The construction is such that the electrically energized bars 23 of the trolley conductors are insulated from each other and from ground at two separate places. In the first place the bars 23 are insulated from the supporting members or brackets 36 by the insulating covering 24 on said bars and in the second place the members or brackets 36 are insulated from each other and from the bridge proper by the members 35 which are also made of insulating material. This is an important safety feature since the insulation between the metal bar 23 and the member 36 can fail without causing serious damage, etc.

The collector assemblies G comprise a plurality of aligned wheels 27 fixed to short shafts 40 rotatably supported in a metal bracket member 41 within a housing 42 made of insulating material. The housing 42 is provided with a bushing 43 intermediate the axes of the wheels 27 through the medium of which bushing it is rotatably and slidably supported on a tubular shaft 44, one end of which is fixed in a member 45 carried by a plurality of links 46 pivoted to opposite ends thereof by pins 47 and to a bracket 48 by pins 49. The bracket 48 is bolted to a vertical upright 50 made of insulating material and carried by the trolley B. The tubular shaft 44 is continuously urged in an upward direction to engage the collector wheels 27 with the concave contact surface 26 of the metal bar 23 by tension springs 51, the lower ends of which are connected to the lower pin 47 while the upper ends thereof are connected to the upper pin 49. The construction is such that as the shaft 44 moves vertically due to irregularities in the conductor bar, etc., the axis thereof always lies in parallel planes. Referring to the particular construction shown, the axis A of the shaft 44 always lies horizontally.

The wheels 27 are adapted to engage the concave contact surface 26 of the conductor and travel therealong. The axis of the tubular shaft 44 is at right angles to the length of the conductor and the fact that the housing 42 is pivoted thereto intermediate the axes of the wheels 27 allows the latter to readily engage the contact surface 26 of the conductor at all times. The bracket member 41 is pivoted for limited movement about a vertical axis within the housing 42 on a vertical pivot 55 directly above the bushing 43. The electrical connection is made with the bracket 41 and in turn the wheels 27 by a terminal post 56 secured to one end of the bracket 41 and provided with a nut 57 for the attachment of a lead or line 58. The terminal post 56 projects through a suitable aperture in the housing 42. The opposite end of the bracket 41 has a screw 59 fixed thereto which projects through a similar aperture in the housing 42. The apertures through which the terminal post 56 and the screw 59 project are slightly larger than the respective members. This permits limited movement of the bracket 41 within the housing 42. Opposite sides of the housing 42 are provided with upwardly extending flanges 60 which project well above the lower ends of the insulating covering 24 of the conductor bar, thus making it very difficult, if not impossible, for one to come in contact with the energized members of the collector assembly. Preferably the exposed parts of the terminal post 56, including the nut 57, are enclosed within a protective non-conducting material. This is most conveniently accomplished by taping the members referred to.

The electrical connections are preferably made to the conductors F at the ends thereof. As shown in Figs. 9, 10 and 11 the lead 61 which it is desired to connect to the conductors F is provided with an end terminal K comprising metallic members 63. The members 63 are provided with apertures opening into the left-hand end thereof similar to the aperture in the conductor bar and within which one end of a conductor H is adapted to be received and form the electrical and mechanical connections between the members. The terminal K is preferably well taped so as to prevent contact with the metal portion thereof. The tape has not been applied to the drawings.

In some instances it is desired to have a terminal midway of the conductor. This is particularly true in the case of the main power conductors D when the crane runways are of considerable length. In this event it is desirable to connect the conductors D intermediate the ends to feeder cables 65 supported thereabove. Figs. 12, 13 and 14 show a preferred form of midway conductor terminal. As shown in these figures, the upper surface of the metal member 23 of the composite conductor is exposed by removing a part of the insulating covering and the electrical connection is made thereto by a member 66 secured thereto by a plurality of screws 67 which have threaded engagement with a member 69 located within the undercut aperture 28 in the member 23, which member 69 engages underneath the flanges formed by the undercut groove 28. The lead 70 which it is desired to connect to the conductor is secured to the member 66 through the medium of a member 71 to which the lead is soldered and a bolt 72 of conventional construction. As shown the outer end only of the member 66 is provided with an insulating covering 73 but preferably the entire member, including the parts 70 and 72, are insulated by taping.

According to the preferred embodiment, the composite conductor bars have a single longitudinal, non-circular aperture therein. It is to be understood, however, that a plurality of apertures may be employed in which event abutting ends of adjacent bars are connected by a plurality of resilient connectors or by a single connector having a plurality of projections on both ends thereof. In the event that the connector or connectors employed in securing abutting ends of conductor bars together are not wholly enclosed within the apertures in the conductor bars the connectors are preferably so constructed and arranged that the contact surfaces 26 of the conductor bars abut each other thus maintaining the number of joints at a minimum.

A conductor of modified construction is shown in Figs. 15 to 18, inclusive. As shown in these figures, the conductor comprises two lengths of composite conductor or conductor bar 75 connected together by a connector, designated generally as 76. Each length or section of composite conductor bar 75 comprises a metal bar-like member 77 made of material of high electrical conductivity and generally similar in shape to the metal bar-like members 23 previously referred to, except that the height of the member is increased and the undercut, rectangular opening 78 therethrough is elongated vertically. Like the member 23, the member 77 is of uniform cross-section throughout its length and is enclosed within an inverted, channel-shaped insulating member 80 in a manner similar to that in which the bar 23 is enclosed by the insulating member 24 except that the lower ends of the member 80 terminate adjacent the lower edges of the bar 77 instead of extending a considerable distance therebelow. Inwardly projecting flanges 81 adjacent to the lower edges of the member 80 enclose or cover the lower or bottom flat edge surfaces of the bar 77 to the outside of the longitudinal channel or groove 82, as clearly shown in Figs. 16 and 17. The insulating covering member 80 which is relatively stiff and normally tightly engages about the bar member 77 can be cemented or otherwise bonded to the member 77 to more securely retain the parts in assembled relation, if desired.

In the present embodiment, the contact surface formed by the groove 82 in the bottom of the bar-like member 77 is V-shaped with a round bottom as distinguished from the semi-circular form shown in the previous embodiment. The composite conductor bars 75 are adapted to be supported in a similar manner to the conductor bars previously described by a bracket 83 similar to the bracket 36 but conforming to the shape of the conductor bar 75 which, as shown, is slightly different from the conductor bar 22.

The connector 76 comprises a rectangular bar-like member 85 of substantially the same width as the width of the longitudinal slot 78 in the conductor bar but of slightly less height and a plate-like member 86 located underneath the member 85. The ends of the member 86 are preferably turned up as at 87 so as to help maintain the same in assembled relation with the member 85. The plate-like member 86 has a width equal to the width of the member 85 and with the member 85 forms a connector, the height and width of which are approximately equal to the height and width of the slot or opening 78 in the conductor bar. One end of the member 85 is provided with a plurality of tapped, vertical holes 87 therein supplied with setscrews 88, the lower ends of which are adapted to engage the member 86 and expand the connector 76 into engagement with the upper and lower surfaces of the slot 78 in a conductor bar into the end of which the end of the connector is inserted. For the purpose of providing access to the screws 88, suitable holes 90 may be formed in the insulating covering 80.

The opposite end of the member 85 of the connector shown has a plurality of apertures 91 opening into its lower face within which springs 92 are located which resiliently urge the parts 85, 86 apart and into engagement with the top and bottom of a slot 78 in a conductor bar into which the connector is inserted. As suggested in alternative constructions, both ends of the connector may be provided with setscrews or springs or the connector may be arranged to be expanded horizontally instead of vertically, as shown.

Like the composite conductor of the first embodiment described, lengths of composite conductor bar 75 can be cut transversely at any place between their ends and the ends of the resulting lengths will be substantially the same in configuration as those of the original and can be assembled in abutting relationship with one length forming a continuation of the other, and mechanically and electrically connected together by connector members of the character shown inserted into adjoining ends of adjacent lengths and enclosed therein.

Although the electrical distribution system of the present invention has been illustrated as applied to an overhead crane, it is to be understood that it may be otherwise employed and is well adapted for use with an electrified monorail system. The fact that the edges of the metallic bar 23 of the conductor above and below the grooves 25 lie in the same plane makes it particularly easy to bend the conductor bar at the time of installation to conform to the curvature of the monorail. Where it is intended that the conductor bar will be bent, the covering 24 is made of suitable material. The conductor bars may be shipped to the point of installation in any convenient lengths and when cut to any size are just as readily assemblable as they were prior to being cut. No special tools nor special fixtures are necessary apart from the connectors. The conductor bars are preferably supported in the position shown in the drawings, in which event the contact surfaces are free from dust and/or ice. Any ice which might form on the lower part of the conductor will be readily broken off by the collector wheels, etc.

Earlier in the specification attention was called to the fact that the electrically energized parts of the trolley conductors were insulated from each other and from the bridge A at two different points. This is also true of the energized parts of the collector assemblies, which parts are insulated from each other and from the trolley B by the housings 42 and the member 50, both of which parts are made of suitable insulating material. The combination of the trolley conductor and current collector and the particular current collector shown herein is claimed in my Patent No. 2,358,116 issued September 12, 1944.

From the foregoing it will be apparent that the objects of the invention heretofore enumerated have been accomplished and that there has been provided a simple, reliable, electrical distribution system of the character referred to which can be readily constructed and erected either in the factory where the equipment is manufactured or at the place where it is to be employed.

While the preferred embodiment of the invention has been described with considerable detail, I do not wish to be limited to the particular construction shown which may be varied within the scope of this invention.

Having thus described my invention, I claim:

1. A length of shockproof conductor for an electrified material handling apparatus including a movable carriage, said length of conductor comprising a rigid rod-like member substantially uniform in transverse cross-section made of material of high electrical conductivity and having a longitudinal groove in one side extending from end to end of the member a surface of which groove is adapted to be engaged by a current collector carried by a movable carriage of the material handling apparatus, said rod-like member having a longitudinal aperture also extending from end to end thereof, said longitudinal aperture being of non-circular shape in transverse cross-section, said length of conductor also comprising a channel-like member substantially uniform in transverse cross-section made of electrical insulating material, said channel-like member enclosing said rod-like member except for the end faces thereof and said groove, whereby said length of conductor can be transversely cut at any place between its ends and the ends of the resulting lengths of conductor will be of substantially the same in configuration as those of the original length of conductor and lengths of said conductor can be assembled in abutting relationship with each other with one length forming a continuation of another and mechanically and electrically connected together by a connector member having its transverse cross sectional configuration of substantially uniform size and shape as that of said aperture inserted into the ends of said apertures in adjoining ends of adjacent lengths of conductors and enclosed therein.

2. A length of shockproof conductor for an electrified material handling apparatus including a movable carriage, said length of conductor comprising a rigid rod-like member substantially uniform in transverse cross-section made of material of high electrical conductivity and having a longitudinal groove in one side extending from end to end of the member a surface of which groove is adapted to be engaged by a current collector carried by a movable carriage of the material handling apparatus, said rod-like member having a longitudinal aperture also extending from end to end thereof, said longitudinal aperture being of non-circular shape in transverse cross-section, said length of conductor also comprising an enclosing channel-like member substantially uniform in transverse cross-section made of electrical insulating material and having inwardly extending flanges along its side edges, and covering said rod-like member along the edges thereof adjacent to said groove, said channel-like member enclosing said rod-like member except for the end faces thereof and said groove, whereby said length of conductor can be transversely cut at any place between its ends and the ends of the resulting lengths of conductor will be of substantially the same in configuration as those of the original length of conductor and lengths of said conductor can be assembled in abutting relationship with each other with one length forming a continuation of another and mechanically and electrically connected together by a connector member having its transverse cross sectional configuration of substantially uniform size and shape as that of said aperture inserted into the ends of said apertures in adjoining ends of adjacent lengths of conductors and enclosed therein.

3. A length of shockproof conductor for an electrified material handling apparatus including a movable carriage, said length of conductor comprising a rigid rod-like member substantially uniform in transverse cross-section made of material of high electrical conductivity and having a longitudinal aperture or groove in one side extending from end to end of the member a surface of which groove is adapted to be engaged by a current collector carried by a movable carriage of the material handling apparatus, said rod-like member having a longitudinal aperture also extending from end to end thereof, said longitudinal aperture being generally of rectangular shape in transverse cross-section, said length of conductor also comprising a channel-like member substantially uniform in transverse cross-section made of electrical insulating material, said channel-like member being coextensive in length with said rod-like member and in contact with and enclosing said rod-like member except for the end faces thereof and said groove, whereby said length of conductor can be transversely cut at any place between its ends and the ends of the resulting lengths of conductor will be the same in configuration as those of the original length of conductor and lengths of said conductor can be assembled in abutting relationship with each other with one length forming a continuation of another and mechanically and electrically connected together by a connector member having its transverse cross sectional configuration of substantially uniform size and shape as that of said aperture inserted into the ends of said apertures in adjoining ends of adjacent lengths of conductors and enclosed therein.

4. A length of shockproof conductor for an electrified material handling apparatus including a movable carriage, said length of conductor comprising a rigid rod-like member substantially uniform in transverse cross-section made of material of high electrical conductivity and having a longitudinal aperture or groove in one side extending from end to end of the member a surface of which groove is adapted to be engaged by a current collector carried by a movable carriage of the material handling apparatus, said rod-like member having a longitudinal aperture also extending from end to end thereof, said longitudinal aperture being generally of rectangular shape in transverse cross-section, said length of conductor also comprising an enclosing channel-like member substantially uniform in transverse cross-section made of electrical insulating material and having inwardly extending flanges along its side edges and covering said rod-like member along the edges thereof adjacent to said groove, said channel-like member being coextensive in length with said rod-like member and in contact with and enclosing said rod-like member except for the end faces thereof and said groove, whereby said length of conductor can be transversely cut at any place between its ends and the ends of the resulting lengths of conductor will be the same in configuration as those of the original length of conductor and lengths of said conductor can be assembled in abutting relationship with each other with one length forming a continuation of another and mechanically and electrically connected together by a connector member having its transverse cross sectional configuration of substantially uniform size and shape as that of said second aperture inserted into the ends of said second apertures in adjoining ends of adjacent lengths of conductors and enclosed therein.

5. A shockproof trolley conductor for an electrified material handling apparatus including a movable carriage, said trolley conductor comprising a plurality of lengths of conductor arranged in end to end abutting relation with one length forming a continuation of the other, each of said lengths comprising a rigid rod-like member substantially uniform in transverse cross-section made of material of high electrical conductivity and having a longitudinal aperture or groove in one side extending from end to end of the member a surface of which groove is adapted to be engaged by a current collector carried by a movable carriage of the material handling apparatus, said rod-like member having a second longitudinal aparture also extending from end to end thereof, said second longitudinal aperture being of non-circular shape in transverse cross-section, each of said lengths of conductor also comprising a channel-like member substantially uniform in transverse cross-section made of electrical insulating material, said channel-like member enclosing said rod-like member except for the end faces thereof and said groove, and a connector member mechanically and electrically connecting together abutting ends of adjoining lengths, said connector member being of substantially the same size and shape in transverse cross-section as that of said second aperture and being inserted into the ends of said second apertures in adjoining ends of adjacent lengths of conductors and enclosed therein.

6. A shockproof trolley conductor for an electrified material handling apparatus including a movable carriage, said trolley conductor comprising a plurality of lengths of conductor arranged in end to end abutting relation with one length forming a continuation of the other, each of said lengths comprising a rigid rod-like member substantially uniform in transverse cross-section made of material of high electrical conductivity and having a longitudinal aperture or groove in one side extending from end to end of the member a surface of which groove is adapted to be engaged by a current collector carried by a movable carriage of the material handling apparatus, said rod-like member having a second longitudinal aperture also extending from end to end thereof, said second longitudinal aperture being of non-circular shape in transverse cross-section, each of said lengths of conductor also comprising an enclosing channel-like member substantially uniform in transverse cross-section made of electrical insulating material and having inwardly extending flanges along its side edges and covering said rod-like member along the edges thereof adjacent to said groove, said channel-like member enclosing said rod-like member except for the end faces thereof and said groove, and a connector member mechanically and electrically connecting together abutting ends of adjoining lengths, said connector member being of substantially the same size and shape in transverse cross-section as that of said second aperture and inserted into the ends of said second apertures in adjoining ends of adjacent lengths of conductors and enclosed therein.

7. A conductor for an electrified material handling system having an electrically driven carriage, said conductor comprising a rigid rod-like electrical conducting member substantially uniform in cross section and having a groove in one side extending longitudinally thereof, a surface of said groove providing a contact surface for a current collector on the electrically driven carriage, said conducting member having an aperture in another side extending longitudinally thereof, said aperture forming an opening along one side of said member and having an undercut form to provide an inwardly facing shoulder adjacent to said opening, and an elongated severable insulating member substantially enclosing said conductor member except for the end faces and the surfaces of said groove and extending over the opening formed by said aperture whereby said conductor member and insulating member can be transversely cut at any point and the ends of the lengths formed by the cuts can be registered with ends of like conductors to form a continuous shockproof conductor by aligning the grooves and apertures of the ends and inserting a connector member in adjacent aligned apertures.

8. A shockproof conductor for an electrified material handling apparatus including an electrically driven carriage, said conductor comprising a plurality of rigid rod-like electrical conducting members each being substantially uniform in cross section and having a groove in one side extending longitudinally thereof, a surface of said groove providing a contact surface for a current collector on the electrically driven carriage, said conducting members each having an aperture in another side extending longitudinally thereof, said aperture forming an opening along one side of said member and having an undercut form to provide an inwardly facing shoulder adjacent to said opening, an elongated severable insulating member substantially enclosing each of said conductor members except for the end faces and the surfaces of said groove and extending over the opening formed by said aperture, and a connector member mechanically and electrically connecting together abutting ends of adjoining conductors, said connector member being of substantially uniform size and shape in transverse cross section as that of said aperture and inserted into the ends of said apertures in adjoining ends of adjacent lengths of conductor members.

WILLIAM G. WEHR.

References Cited in the file of this patent

UNITED STATES PATENTS

| Number | Name | Date |
|---|---|---|
| Re. 3,123 | Wakeman | Sept. 15, 1868 |
| 124,977 | Sanborn | Mar. 26, 1872 |
| 440,780 | Verstraete | Nov. 18, 1890 |
| 477,680 | Moxham | June 28, 1892 |
| 532,796 | Lewis | Jan. 22, 1895 |
| 1,835,640 | Drake | Dec. 8, 1931 |
| 1,869,145 | Greis | July 26, 1932 |
| 2,254,147 | Horn | Aug. 26, 1941 |
| 2,304,720 | Wehr | Dec. 8, 1942 |
| 2,358,116 | Wehr | Sept. 12, 1944 |
| 2,361,721 | Van Deventer | Oct. 31, 1944 |